(12) United States Patent
Park et al.

(10) Patent No.: US 9,840,585 B2
(45) Date of Patent: *Dec. 12, 2017

(54) POLYCARBONATE RESIN COMPOSITION

(71) Applicant: LG CHEM, LTD., Seoul (KR)

(72) Inventors: Jung Jun Park, Daejeon (KR); Hyong Min Bahn, Daejeon (KR); Young Young Hwang, Daejeon (KR); Moo Ho Hong, Daejeon (KR); Ki Jae Lee, Daejeon (KR); Byoung Kyu Chun, Daejeon (KR); Un Ko, Daejeon (KR); Young Wook Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,740

(22) PCT Filed: Nov. 16, 2015

(86) PCT No.: PCT/KR2015/012296
§ 371 (c)(1),
(2) Date: Mar. 22, 2016

(87) PCT Pub. No.: WO2016/089028
PCT Pub. Date: Jun. 9, 2016

(65) Prior Publication Data
US 2016/0369095 A1 Dec. 22, 2016

(30) Foreign Application Priority Data

Dec. 4, 2014 (KR) .................. 10-2014-0173005
Nov. 6, 2015 (KR) .................. 10-2015-0156121

(51) Int. Cl.
*C08L 69/00* (2006.01)
*C08G 64/08* (2006.01)
(Continued)

(52) U.S. Cl.
CPC ........... *C08G 64/085* (2013.01); *C08G 64/06* (2013.01); *C08G 64/1666* (2013.01); *C08G 64/1691* (2013.01); *C08G 64/18* (2013.01); *C08G 64/186* (2013.01); *C08G 64/24* (2013.01); *C08G 64/307* (2013.01); *C08G 64/38* (2013.01); *C08G 77/448* (2013.01); *C08J 5/00* (2013.01); *C08K 5/3475* (2013.01); *C08L 69/00* (2013.01); *C08L 69/005* (2013.01); *C08L 83/04* (2013.01); *C08L 83/10* (2013.01); *C08L 2201/10* (2013.01); *C08L 2205/02* (2013.01); *C08L 2205/025* (2013.01)

(58) Field of Classification Search
CPC ...................................................... C08L 69/00
See application file for complete search history.

(56) References Cited

U.S. PATENT DOCUMENTS 3,819,744 A   6/1974 Buechner et al.
5,137,949 A   8/1992 Paul et al.
(Continued)

FOREIGN PATENT DOCUMENTS

CN   101124282 A   2/2008
CN   101585961 A   11/2009
(Continued)

OTHER PUBLICATIONS

Hwang, et al.: "Production of impact strength and fluidity-improved polycarbonate and composition comprising same", Chemical Abstract for US2016/0251481A1, Mar. 24, 2016.
(Continued)

*Primary Examiner* — David Buttner
(74) *Attorney, Agent, or Firm* — Dentons US LLP

(57) ABSTRACT

Disclosed is a polycarbonate resin composition including 1) a copolycarbonate having a repeating unit represented by Chemical Formula 1, a repeating unit represented by Chemical Formula 2, and a repeating unit represented by Chemical Formula 3, and 2) a polycarbonate:

[Chemical Formula 1]

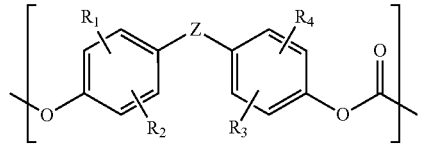

[Chemical Formula 2]

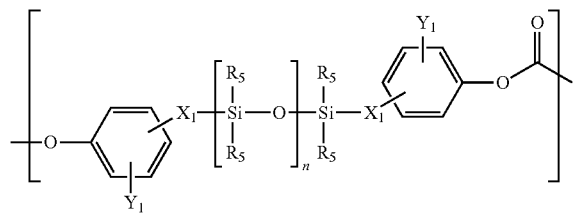

[Chemical Formula 3]

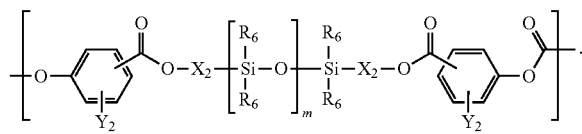

copolycarbonate in the composition provides improved melting properties while maintaining the physical properties of the copolycarbonate to the maximum.

13 Claims, No Drawings

(51) Int. Cl.

| | | |
|---|---|---|
| *C08G 64/18* | (2006.01) | |
| *C08G 64/38* | (2006.01) | |
| *C08G 77/448* | (2006.01) | |
| *C08J 5/00* | (2006.01) | |
| *C08G 64/16* | (2006.01) | |
| *C08G 64/06* | (2006.01) | |
| *C08G 64/30* | (2006.01) | |
| *C08K 5/3475* | (2006.01) | |
| *C08L 83/04* | (2006.01) | |
| *C08G 64/24* | (2006.01) | |
| *C08L 83/10* | (2006.01) | |

(56) References Cited

U.S. PATENT DOCUMENTS

| | | | |
|---|---|---|---|
| 5,324,454 | A | 6/1994 | Takata et al. |
| 5,380,795 | A | 1/1995 | Gosens et al. |
| 5,455,310 | A | 10/1995 | Hoover et al. |
| 5,502,134 | A | 3/1996 | Okamoto et al. |
| 5,530,083 | A | 6/1996 | Phelps et al. |
| 5,608,026 | A | 3/1997 | Hoover et al. |
| 5,783,651 | A | 7/1998 | König et al. |
| 5,932,677 | A | 8/1999 | Hoover et al. |
| 6,001,929 | A | 12/1999 | Nodera et al. |
| 6,252,013 | B1 | 6/2001 | Banach et al. |
| 6,281,286 | B1 | 8/2001 | Chorvath et al. |
| 6,780,956 | B2 | 8/2004 | Davis |
| 7,135,538 | B2 | 11/2006 | Glasgow et al. |
| 7,332,559 | B2 | 2/2008 | Hong et al. |
| 7,365,125 | B2 | 4/2008 | Govaerts et al. |
| 7,432,327 | B2 | 10/2008 | Glasgow |
| 7,498,401 | B2 | 3/2009 | Agarwal |
| 7,524,919 | B2 | 4/2009 | Hoover et al. |
| 7,691,304 | B2 | 4/2010 | Agarwal et al. |
| 7,709,562 | B2 | 5/2010 | Li et al. |
| 7,709,581 | B2 | 5/2010 | Glasgow et al. |
| 7,718,733 | B2 | 5/2010 | Juikar et al. |
| 8,030,379 | B2 | 10/2011 | Nodera et al. |
| 8,084,134 | B2 | 12/2011 | Malinoski et al. |
| 8,124,683 | B2 | 2/2012 | Jung et al. |
| 8,389,648 | B2 | 3/2013 | Adoni et al. |
| 8,466,249 | B2 | 6/2013 | Gallucci et al. |
| 8,552,096 | B2 | 10/2013 | Li et al. |
| 8,912,290 | B2 | 12/2014 | Huggins et al. |
| 8,933,186 | B2 | 1/2015 | Bahn et al. |
| 8,962,780 | B2 | 2/2015 | Higaki et al. |
| 8,981,017 | B2 | 3/2015 | Ishikawa |
| 9,062,164 | B2 | 6/2015 | Kim et al. |
| 9,080,021 | B2 | 7/2015 | Ishikawa et al. |
| 9,102,832 | B2 | 8/2015 | Sybert et al. |
| 9,255,179 | B2 | 2/2016 | Park et al. |
| 2003/0027905 | A1 | 2/2003 | Mahood et al. |
| 2003/0065122 | A1 | 4/2003 | Davis |
| 2004/0200303 | A1 | 10/2004 | Inoue et al. |
| 2006/0148986 | A1 | 7/2006 | Glasgow et al. |
| 2007/0093629 | A1 | 4/2007 | Silva et al. |
| 2007/0135569 | A1 | 6/2007 | Derudder |
| 2007/0241312 | A1 | 10/2007 | Hikosaka |
| 2007/0258412 | A1 | 11/2007 | Schilling et al. |
| 2008/0015289 | A1 | 1/2008 | Siripurapu |
| 2008/0081895 | A1 | 4/2008 | Lens et al. |
| 2008/0230751 | A1* | 9/2008 | Li .................... C08L 69/00 252/582 |
| 2009/0087761 | A1 | 4/2009 | Fukushima et al. |
| 2009/0326183 | A1 | 12/2009 | Schultz et al. |
| 2010/0233603 | A1 | 9/2010 | Hikosaka |
| 2012/0123034 | A1 | 5/2012 | Morizur et al. |
| 2012/0251750 | A1 | 10/2012 | Sybert et al. |
| 2012/0252985 | A1 | 10/2012 | Rosenquist et al. |
| 2012/0271009 | A1 | 10/2012 | Higaki et al. |
| 2012/0283393 | A1 | 11/2012 | Ishikawa |
| 2013/0035441 | A1 | 2/2013 | De Brouwer et al. |
| 2013/0082222 | A1 | 4/2013 | Aoki |
| 2013/0186799 | A1 | 7/2013 | Stam et al. |
| 2013/0190425 | A1 | 7/2013 | Zhu et al. |
| 2013/0261235 | A1 | 10/2013 | Minemura et al. |
| 2013/0267665 | A1 | 10/2013 | Huggins et al. |
| 2013/0274392 | A1 | 10/2013 | Morizur et al. |
| 2013/0289224 | A1 | 10/2013 | Bae et al. |
| 2013/0309474 | A1 | 11/2013 | Peek et al. |
| 2013/0313493 | A1 | 11/2013 | Wen et al. |
| 2013/0317142 | A1 | 11/2013 | Chen et al. |
| 2013/0317146 | A1 | 11/2013 | Li et al. |
| 2013/0317148 | A1 | 11/2013 | Zheng et al. |
| 2013/0317150 | A1 | 11/2013 | Wan et al. |
| 2013/0331492 | A1 | 12/2013 | Sharma |
| 2014/0106208 | A1 | 4/2014 | Ishikawa et al. |
| 2014/0148559 | A1 | 5/2014 | Kim et al. |
| 2014/0179843 | A1 | 6/2014 | Van Der Mee et al. |
| 2014/0206802 | A1 | 7/2014 | Bahn et al. |
| 2014/0256888 | A1 | 9/2014 | Ishikawa et al. |
| 2014/0323623 | A1 | 10/2014 | Miyake et al. |
| 2015/0057423 | A1 | 2/2015 | Kim et al. |
| 2015/0175802 | A1 | 6/2015 | Sybert et al. |
| 2015/0183985 | A1 | 7/2015 | Hong et al. |
| 2015/0197633 | A1 | 7/2015 | Van Der Mee et al. |
| 2015/0210854 | A1 | 7/2015 | Aoki |
| 2015/0218371 | A1 | 8/2015 | Lee et al. |
| 2015/0307706 | A1 | 10/2015 | Rosenquist et al. |
| 2015/0315380 | A1 | 11/2015 | Bahn et al. |
| 2015/0344623 | A1 | 12/2015 | Park et al. |
| 2015/0368484 | A1 | 12/2015 | Shishaku et al. |
| 2016/0002410 | A1 | 1/2016 | Iyer et al. |
| 2016/0017102 | A1 | 1/2016 | Yamada |
| 2016/0083527 | A1 | 3/2016 | Mittal et al. |
| 2016/0122477 | A1 | 5/2016 | Rhee et al. |
| 2016/0251481 | A1 | 9/2016 | Hwang et al. |
| 2016/0297926 | A1* | 10/2016 | Hwang .................... C08J 5/00 |
| 2016/0326312 | A1* | 11/2016 | Park .................... C08G 64/18 |
| 2016/0326313 | A1 | 11/2016 | Son et al. |
| 2016/0326314 | A1 | 11/2016 | Son et al. |
| 2016/0326321 | A1 | 11/2016 | Park et al. |
| 2016/0369047 | A1 | 12/2016 | Hwang et al. |
| 2016/0369048 | A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |

(56) References Cited

FOREIGN PATENT DOCUMENTS

| | | |
|---|---|---|
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 10-2015-0119823 A | 10/2015 |
| KR | 10-1563269 B1 | 10/2015 |
| KR | 2015-0134457 A | 12/2015 |
| TW | 201241043 A | 10/2012 |
| WO | 2012/060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013/175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2015/011669 A2 | 1/2015 |
| WO | 2015/015445 A2 | 2/2015 |
| WO | WO-2015/041441 * | 3/2015 |
| WO | 2015/087595 A1 | 6/2015 |

OTHER PUBLICATIONS

Chemical Abstract registry No. 163617-00-3, Jun. 8, 1995.

* cited by examiner

POLYCARBONATE RESIN COMPOSITION

CROSS-REFERENCE TO RELATED APPLICATION(S)

This application is a National Stage Entry of International Application No. PCT/KR2015/012296, filed on Nov. 16, 2015, and claims the benefit of and priority to Korean Application No. 10-2014-0173005, filed on Dec. 4, 2014, and Korean Application No. 10-2015-0156121, filed on Nov. 6, 2015, all of which are incorporated herein by reference in their entirety for all purposes as if fully set forth herein.

TECHNICAL FIELD

The present invention relates to a polycarbonate resin composition which can improve melting properties of the copolycarbonate in which a polysiloxane structure is introduced in a main chain of the polycarbonate.

BACKGROUND OF ART

Polycarbonate resins are prepared by condensation-polymerization of an aromatic diol such as bisphenol A with a carbonate precursor such as phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and when chemical resistance or impact strength, particularly impact strength at low temperature is increased, melt index or the like is conversely lowered.

In particular, a reduction in the melt index means a reduction in the workability and thus there is a need for a method for increasing the melt index while maintaining other physical properties to the maximum.

Given the above circumstances, the present inventors have conducted intensive studies to overcome the above-mentioned disadvantages encountered with the prior arts and develop a method for increasing the melt index while maintaining to the maximum excellent melting properties of a copolycarbonate in which a polysiloxane structure is introduced in a main chain of the polycarbonate, and found that a polycarbonate resin composition comprising a polycarbonate in addition to a copolycarbonate as described below satisfies the above-described properties. The present invention has been completed on the basis of such a finding.

DETAILED DESCRIPTION OF THE INVENTION

Technical Problem

It is an object of the present invention to provide a polycarbonate resin composition which can improve melting properties of the copolycarbonate in which a polysiloxane structure is introduced in a main chain of the polycarbonate.

It is another object of the present invention to provide an article comprising the above-mentioned polycarbonate composition.

Technical Solution

In order to achieve these objects, the present invention provides a polycarbonate resin composition comprising: 1) a copolycarbonate comprising a repeating unit represented by the following Chemical Formula 1, a repeating unit represented by the following Chemical Formula 2, and a repeating unit represented by the following Chemical Formula 3, and 2) a polycarbonate:

[Chemical Formula 1]

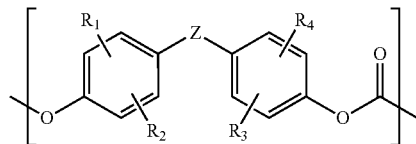

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

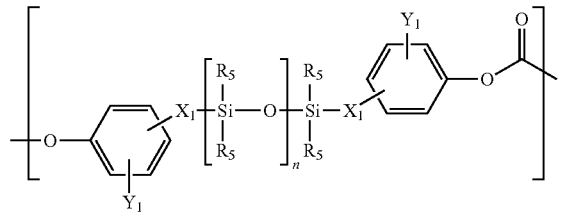

in the Chemical Formula 2, each of $X_1$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 1 to 200,

[Chemical Formula 3]

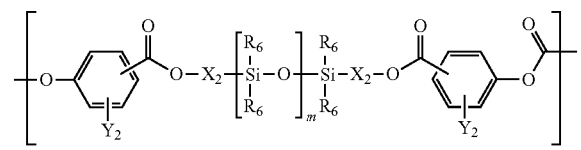

in the Chemical Formula 3, each of $X_2$ is independently $C_{1-10}$ alkylene, each of $Y_2$ is independently hydrogen, $C_{1-6}$ alkyl, halogen, hydroxy, $C_{1-6}$ alkoxy, or $C_{6-20}$ aryl, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 1 to 200.

Polycarbonates are prepared by condensation-polymerization of an aromatic diol such as bisphenol A with a carbonate precursor such as a phosgene and have excellent impact strength, dimensional stability, heat resistance and transparency. The polycarbonates have application in a wide range of uses, such as exterior materials of electrical and electronic products, automobile parts, building materials, and optical components. In order to improve the physical properties of these polycarbonates further, it is possible to introduce a polysiloxane structure in a main chain of the polycarbonate, which may improve several physical properties. However, the polycarbonate in which a polysiloxane structure is introduced may reduce melting properties, which contributes to reduce the workability.

Thus, as the resin composition of the present invention comprises a polycarbonate together with a copolycarbonate in which a polysiloxane structure is introduced in a main chain of the polycarbonate, it can improve a melting property while maintaining the physical properties of the copolycarbonate to the maximum.

Hereinafter, the present invention will be described in detail, and for the convenience of classification and description of each component, the copolycarbonate is represented by 'A' and the polycarbonate is represented by 'B'.

Copolycarbonate (A)

The copolycarbonate (A) according to the present invention refers to a polymer in which a polysiloxane structure is introduced in a main chain of the polycarbonate.

The main chain of the polycarbonate is formed by reacting an aromatic diol compound and a carbonate precursor, and specifically refers to a repeating unit represented by the Chemical Formula 1.

Preferably, in the Chemical Formula 1, $R_1$, $R_2$, $R_3$ and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

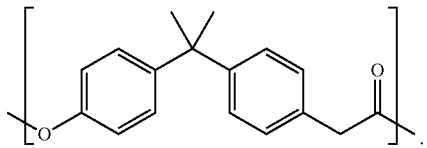

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

The siloxane structure refers to a repeating unit represented by the Chemical Formula 2 and a repeating unit represented by the Chemical Formula 3.

In the Chemical Formula 2, each of $X_1$ is independently preferably $C_{2-10}$ alkylene, more preferably $C_{2-4}$ alkylene and most preferably propane-1,3-diyl.

Further, $Y_1$ is preferably hydrogen or $C_{1-6}$ alkoxy, more preferably hydrogen or $C_{1-4}$ alkoxy, and most preferably hydrogen, or methoxy.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 75, not more than 70, not more than 65, not more than 60, not more than 55, not more than 50, not more than 45, not more than 40, not more than 39, not more than 38, or not more than 37.

In the Chemical Formula 3, each of $X_2$ is independently preferably $C_{2-10}$ alkylene, more preferably $C_{2-6}$ alkylene and most preferably isobutylene.

Further, preferably, $Y_2$ is hydrogen.

Further, preferably, each of $R_6$ is independently hydrogen, methyl, ethyl, propyl, 3-phenylpropyl; 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably; each of $R_6$ is independently $C_{1-10}$ alkyl, more preferably $C_{1-6}$ alkyl, more preferably $C_{1-3}$ alkyl, and most preferably methyl.

Preferably, m is not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are, respectively, derived from a siloxane compound represented by the following Chemical Formula 2-1 and a siloxane compound represented by the following Chemical Formula 3-1:

[Chemical Formula 2-1]

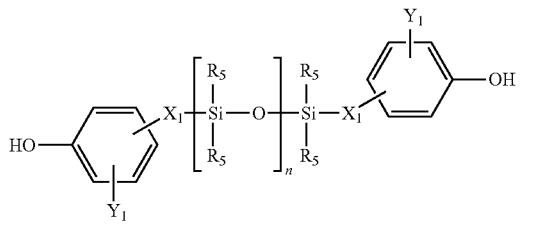

in the Chemical Formula 2-1, $X_1$, $Y_1$, $R_5$ and n are the same as previously defined.

[Chemical Formula 3-1]

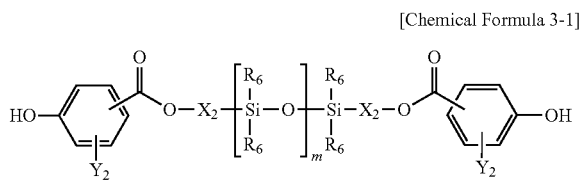

in the Chemical Formula 3-1, $X_2$, $Y_2$, $R_6$ and m are the same as previously defined.

As used herein, 'derived from a siloxane compound' means that a hydroxy group of the respective siloxane compound and a carbonate precursor are reacted to form the repeating unit represented by Chemical Formula 2 and the repeating unit represented by Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2, respectively.

[Reaction Scheme 1]

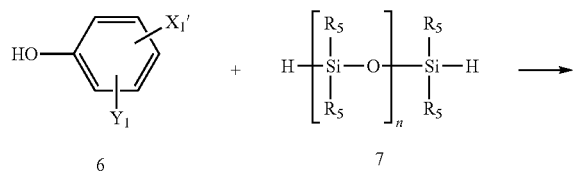

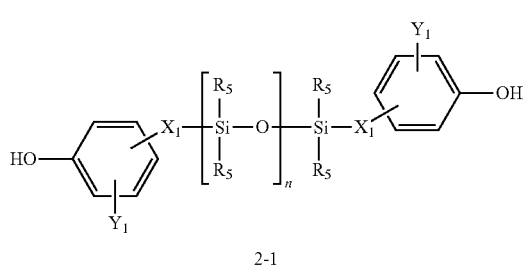

in the Reaction Scheme 1,
$X_1'$ is $C_{2-10}$ alkenyl, and
$X_1$, $Y_1$, $R_5$ and n are the same as previously defined.

[Reaction Scheme 2]

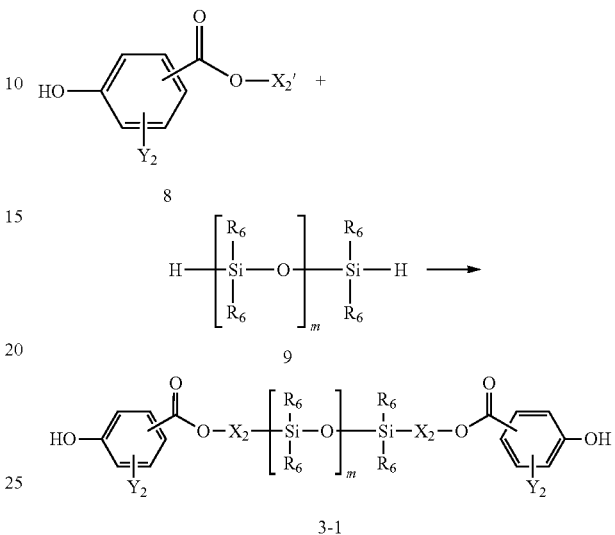

in the Reaction Scheme 2,
$X_2'$ is $C_{2-10}$ alkenyl, and
$X_2$, $Y_2$, $R_6$ and m are the same as previously defined.

In Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2$(COD), $PtCl_2$(benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane and octaphenylcyclotetrasiloxane and the like may be included.

The above organodisiloxane may be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight or not more than 3 parts by weight, based on 100 parts by weight of the organocyclosiloxane.

In particular, by adjusting the content of the repeating unit represented by Chemical Formula 2 and the repeating unit represented by Chemical Formula 3, the physical properties of the copolycarbonate (A) can be adjusted. Preferably, the weight ratio between the repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 2-1 and the siloxane compound represented by Chemical Formula 3-1.

Preferably, the repeating unit represented by Chemical Formula 2 is represented by the following Chemical Formula 2-2 or the following Chemical Formula 2-3:

unit represented by Chemical Formulae 2-2 or 2-3, and the repeating unit represented by Chemical Formula 3-2 is provided.

Further, the weight ratio between the weight of the repeating unit represented by Chemical Formula 1, and the total weight of the repeating unit represented by Chemical Formula 2 and the repeating unit represented by Chemical Formula 3 (Chemical Formula 1:(Chemical Formula 2+Chemical Formula 3)) is preferably 1:0.04-0.07.

Further, the present invention provides a method for preparing the above-described copolycarbonate (A) comprising a step of polymerizing the aromatic diol compound, the carbonate precursor and one or more siloxane compounds.

The aromatic diol compound, the carbonate precursor and one or more siloxane compounds are the same as previously described.

During the polymerization, one or more siloxane compounds may be used in an amount of not less than 1% by weight, not less than 1.1% by weight, not less than 1.2% by weight, not less than 1.3% by weight, not less than 1.4% by weight, or not less than 1.5% by weight; and not more than 3% by weight, not more than 2.9% by weight, not more than 2.8% by weight, not more than 2.7% by weight, not more

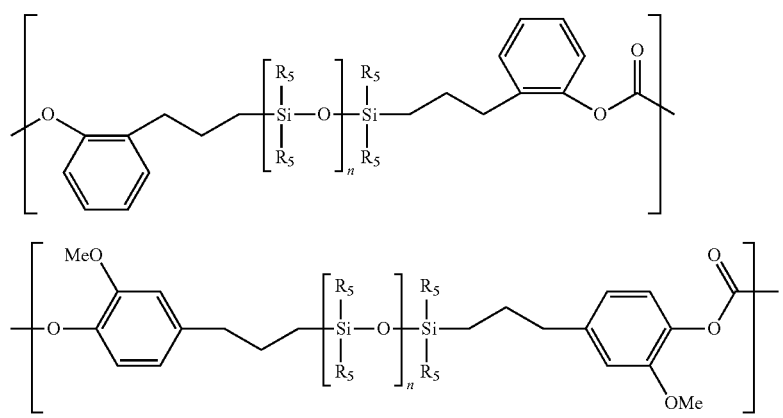

[Chemical Formula 2-2]

[Chemical Formula 2-3]

in the Chemical Formulae 2-2 and 2-3, $R_5$ and n are the same as previously defined. Preferably, $R_5$ is methyl.

Further, preferably, the repeating unit represented by Chemical Formula 3 is represented by the following Chemical Formula 3-2:

than 2.6% by weight, not more than 2.5% by weight, not more than 2.4% by weight, not more than 2.3% by weight, not more than 2.2% by weight, not more than 2.1% by weight or not more than 2% by weight, based on 100% by weight in total of the aromatic diol compound, the carbonate

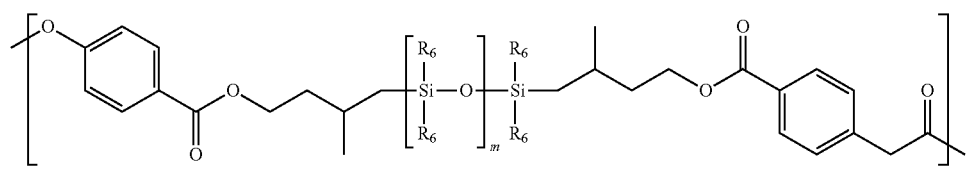

[Chemical Formula 3-2]

in the Chemical Formulae 3-2, $R_6$ and m are the same as previously defined. Preferably, $R_6$ is methyl.

Further, preferably, in the above-described copolycarbonate (A), the copolycarbonate comprising all of the repeating unit represented by Chemical Formula 1-1, the repeating precursor and one or more siloxane compounds. Also, the above aromatic diol compound may be used in an amount of not less than 40% by weight, not less than 50% by weight, or not less than 55% by weight; and not more than 80% by weight, not more than 70% by weight, or not more than 65% by weight, based on 100% by weight in total of the aromatic dial compound, the carbonate precursor and one or more siloxane compounds. The above carbonate precursor may be used in an amount of not less than 10% by weight, not less than 20% by weight, or not less than 30% by weight; and not more than 60% by weight, not more than 50% by weight, or not more than 40 by weight, based on 100% by weight in total of the aromatic diol compound, the carbonate precursor and one or more siloxane compounds.

Further, as the polymerization method, an interfacial polymerization method may be used as one example. In this case, there is an effect in that the polymerization reaction can be made at low temperature and atmospheric pressure, and it is easy to control the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate (A) having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene may be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic dial compound. Within this range, the required molecular weight may be obtained.

Further, preferably, the above polycarbonate (A) has a weight average molecular weight (g/mol) of 1,000 to 100,000, and more preferably 15,000 to 35,000. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight is not more than 34,000, not more than 33,000, or not more than 32,000.

Polycarbonate (B)

The polycarbonate (B) according to the present invention is distinguished from the copolycarbonate (A) in that a polysiloxane structure is not introduced in a main chain of the polycarbonate.

Preferably, the above polycarbonate comprises a repeating unit represented by the following Chemical Formula 4:

[Chemical Formula 4]

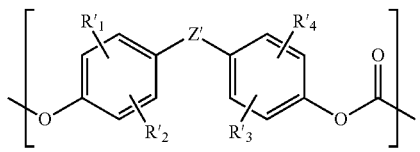

in the Chemical Formula 4, $R'_1$, $R'_2$, $R'_3$ and $R'_4$ are each independently hydrogen, $C_{1-10}$ alkyl, $C_{1-10}$ alkoxy, or halogen, and Z' is $C_{1-10}$ alkylene unsubstituted or substituted with phenyl, $C_{3-15}$ cycloalkylene unsubstituted or substituted by $C_{1-10}$ alkyl, O, S, SO, $SO_2$ or CO.

Further, preferably; the above polycarbonate (B) has a weight average molecular weight of 1,000 to 100,000 g/mol, and more preferably 10,000 to 35,000 g/mol. More preferably, the above weight average molecular weight (g/mol) is not less than 11,000, not less than 12,000, not less than 13,000, not less than 14,000, not less than 15,000, not less than 16,000, not less than 17,000, or not less than 18,000. Further, the above weight average molecular weight (g/mol) is not more than 34,000, not more than 33,000, not more than 32,000, not more than 31,000, not more than 30,000, or not more than 29,000.

The repeating unit represented by Chemical Formula 4 is formed by reacting the aromatic dial compound and the carbonate precursor. The aromatic dial compound and the carbonate precursor that may be used herein are the same as previously described for the repeating unit represented by Chemical Formula 1.

Preferably, $R'_1$, $R'_2$, $R'_3$, $R'_4$ and Z' in Chemical Formula 4 are the same as previously described for $R_1$, $R_2$, $R_3$, $R_4$ and Z in Chemical Formula 1, respectively.

Further, preferably, the repeating unit represented by Chemical Formula 4 is represented by the following Chemical Formula 4-1:

[Chemical Formula 4-1]

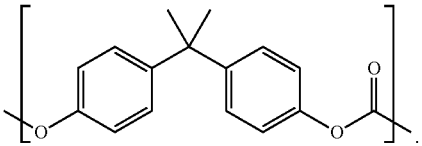

In addition, the method for preparing the polycarbonate (B) is the same the method for preparing the copolycarbonate (A), except that one or more siloxane compounds are not used.

Polycarbonate Resin Composition

The polycarbonate resin composition according to the present invention comprises the above-described copolycarbonate (A) and polycarbonate (B).

The melting property of the polycarbonate resin composition may be adjusted by adjusting the mixing ratio of the above-described copolycarbonate (A) and polycarbonate (B). In the polycarbonate resin composition, the weight ratio of the copolycarbonate (A) and polycarbonate (B) is preferably 1:99 to 99:1, more preferably 10:90 to 90:10 and most preferably 20:80 to 80:20.

In addition, the the polycarbonate resin composition may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

In addition, the present invention provides an article comprising the above-mentioned polycarbonate resin composition. Preferably, the above article is an injection molded article.

The method for preparing the article may comprise the steps of mixing the copolycarbonate resin composition according to the present invention and additives such as antioxidants using a mixer, extrusion-molding the mixture with an extruder to produce a pellet, drying the pellet and then injecting the dried pellet with an injection molding machine.

Advantageous Effects

As set forth above, the polycarbonate resin composition according to the present invention comprises a polycarbonate in addition to the copolycarbonate in which a polysiloxane compound is introduced in a main chain of the polycarbonate and thus can improve the melting properties of the copolycarbonate while maintaining excellent physical properties of the copolycarbonate to the maximum.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1: AP-PDMS (n=34)

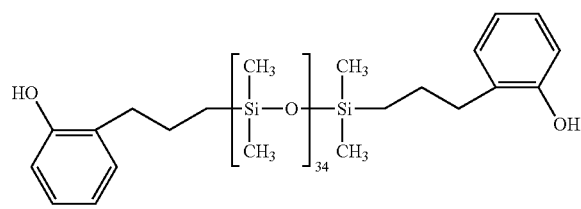

47.60 g (160 mmol) of octamethylcyclotetrasiloxane and 2.40 g (17.8 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as AP-PDMS (11=34). AP-PDMS was pale yellow oil and the repeating unit (n) was 34 when confirmed through $^1$H NMR using a Varian 500 MHz, and further purification was not required.

Preparation Example 2: MBHB-PDMS (m=58)

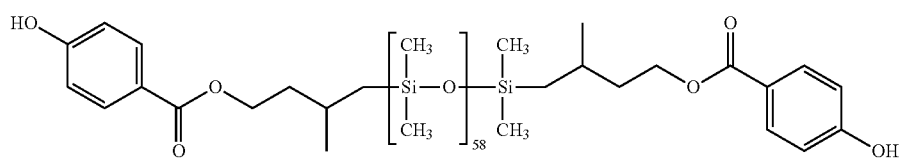

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (m) of the terminal-unmodified polyorganosiloxane thus prepared was 58 when confirmed through $^1$H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as MBHB-PDMS (m=58). MBHB-PDMS was pale yellow oil and the repeating unit (m) was 58 when confirmed through $^1$H NMR using a Varian 500 MHz, and further purification was not required.

Preparation Example 3: EU-PDMS (n=50)

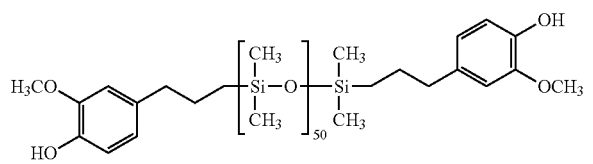

47.60 g (160 mmol) of octamethylcyclotetrasiloxane and 1.7 g (13 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 50 when confirmed through $^1$H NMR.

To the resulting terminal-unmodified polyorganosiloxane, 6.13 g (29.7 mmol) of Eugenol and 0.01 g (50 ppm) of Karstedt's platinum catalyst were added and reacted at 90° C. for 3 hours. After completion of the reaction, the unreacted siloxane was removed by conducting evaporation under conditions of 120° C. and 1 torr. The terminal-modified polyorganosiloxane thus prepared was designated as EU-PDMS. EU-PDMS was pale yellow oil and the repeating unit (n) was 50 when confirmed through $^1$H NMR using a Varian 500 MHz, and further purification was not required.

Preparation Example 4: Eugenol-PDMS (n=34)

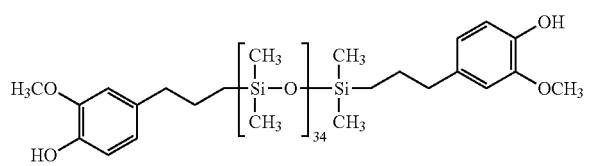

EU-PDMS with the repeating unit (n) of 34 was prepared in the same manner as in Preparation Example 3, except that the content of the octamethylcyclotetrasiloxane and the tetramethyldisiloxane was adjusted.

Preparation Example 5: Copolycarbonate (A-1)

1784 g of water, 385 g of NaOH and 232 g of BPA (bisphenol A) were introduced in a polymerization reactor, and dissolved with mixing under a $N_2$ atmosphere. 4.3 g of PTBP (para-tert butylphenol) and 6.57 g of polydimethylsiloxane (the mixture (weight ratio of 90:10) of 5.91 g of AP-PDMS 01=34) prepared in Preparation Example 1 and 0.66 g of MBHB-PDMS (m=58) prepared in Preparation Example 2) were dissolved in MC (methylene chloride) and added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and pH of a produced polymer was adjusted to neutral pH of 6 to 7 by washing three times with distilled water. The polymer thus obtained was re-precipitated in a mixed solution of methanol and hexane, and then dried at 120° C. to give a final copolycarbonate. The weight average molecular weight of the resulting copolycarbonate was 31,500 g/mol when measured by GPC using PC Standard with Agilent 1200 series.

Preparation Example 6: Copolycarbonate (A-2)

The copolycarbonate was prepared in the same manner as in Preparation Example 5, except that 6.57 g of AP-PDMS (n=34) prepared in Preparation Example 1 was used as the polydimethylsiloxane.

Preparation Example 7: Copolycarbonate (A-3)

The copolycarbonate was prepared in the same manner as in Preparation Example 5, except that 6.57 g of EU-PDMS (n=50) prepared in Preparation Example 3 was used as the polydimethylsiloxane.

Preparation Example 8: Copolycarbonate (A-4)

The copolycarbonate was prepared in the same manner as in Preparation Example 4, except that the mixture (weight ratio of 90:10) of 5.91 g of Eugenol-PDMS (n=34) prepared in Preparation Example 4 and 0.66 g of MBHB-PDMS (m=58) prepared in Preparation Example 2 was used as the polydimethylsiloxane.

Preparation Example 9: Polycarbonate (B-1)

1784 g of water, 385 g of NaOH and 232 g of BPA (bisphenol A) were introduced in a polymerization reactor, and dissolved with mixing under a $N_2$ atmosphere. 4.7 g of PTBP (para-tert butylphenol) was dissolved in MC (methylene chloride) and added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and pH of a produced polymer was adjusted to neutral pH of 6 to 7 by washing three times with distilled water. The polymer thus obtained was re-precipitated in a mixed solution of methanol and hexane, and then dried at 120° C. to give a final polycarbonate. The weight average molecular weight of the resulting polycarbonate was 29,000 g/mol when measured by GPC using PC Standard with Agilent 1200 series.

Preparation Example 10: Polycarbonate (B-2)

The polycarbonate was prepared in the same manner as in Preparation Example 9, except that 6.8 g of PTBP was used. The weight average molecular weight of the resulting polycarbonate was 23,000 g/mol when measured by GPC using PC Standard with Agilent 1200 series.

Preparation Example 11: Polycarbonate (B-3)

The polycarbonate was prepared in the same manner as in Preparation Example 9, except that 9.9 g of PTBP was used. The weight average molecular weight of the resulting polycarbonate was 18,800 g/mol when measured by GPC using PC Standard with Agilent 1200 series.

Example and Comparative Example: Polycarbonate Resin Composition

The copolycarbonate and polycarbonate previously prepared were mixed in the weight ratio as described in Table 1 below to prepare a polycarbonate resin composition.

With respect to 1 part by weight of the respective polycarbonate resin composition prepared in the examples and comparative examples, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a φ30 mm twin-screw extruder provided with a vent, and was injection-molded at a cylinder temperature of 300° C. and a mold temperature of 80° C. using an injection molding machine N-200 (manufactured by JSW, Ltd.) to prepare a desired specimen.

The physical properties of the above specimens were determined in the following manner and the results were shown in Tables 1 and 2 below.

1) Impact strength at low temperature: measured at −30° C. in accordance with ASTM D256 (⅛ inch, Notched Izod).
2) Weight average molecular weight (Mw): measured by GPO using PC Standard with Agilent 1200 series.
3) Melt index (MI): measured in accordance with ASTM D1238 (conditions of 300° C. and 1.2 kg).

TABLE 1

|  | Example 1 | Example 2 | Example 3 | Example 4 | Example 5 | Example 6 | Example 7 |
|---|---|---|---|---|---|---|---|
| A-1 (wt %) | 80 | 80 | 80 | 60 | 60 | 60 | — |
| A-2 (wt %) | — | — | — | — | — | — | — |
| A-3 (wt %) | — | — | — | — | — | — | — |
| A-4 (wt %) | — | — | — | — | — | — | 80 |
| B-1 (wt %) | 20 | — | — | 40 | — | — | 20 |
| B-2 (wt %) | — | 20 | — | — | 40 | — | — |
| B-3 (wt %) | — | — | 20 | — | — | 40 | — |
| Impact strength at low-temperature (J/mol) | 689 | 707 | 667 | 767 | 641 | 579 | 450 |
| Mw (g/mol) | 30000 | 28400 | 28500 | 29700 | 27200 | 26800 | 30000 |
| Ml (g/10 min) | 5.26 | 6.70 | 6.46 | 6.56 | 9.97 | 11.39 | 5 |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| A-1 (wt %) | 100 | — | — | — | — | — |
| A-2 (wt %) | — | 100 | — | — | — | — |
| A-3 (wt %) | — | — | 80 | — | — | — |
| A-4 (wt %) | — | — | — | 100 | 60 | — |
| B-1 (wt %) | — | — | — | — | — | 100 |
| B-2 (wt %) | — | — | 20 | — | — | — |
| B-3 (wt %) | — | — | — | — | 40 | — |
| Impact strength at low-temperature (J/mol) | 730 | 530 | 437 | 670 | 510 | 540 |
| Mw (g/mol) | 30200 | 30200 | 28000 | 30000 | 26500 | 30200 |
| Ml (g/10 min) | 4.00 | 5.40 | 7.10 | 4.90 | 10.50 | 3.8 |

The invention claimed is:

1. A polycarbonate resin composition comprising:
   1) a copolycarbonate comprising a repeating unit represented by Chemical Formula 1, a repeating unit represented by Chemical Formula 2, and a repeating unit represented by Chemical Formula 3, and
   2) a polycarbonate:

[Chemical Formula 1]

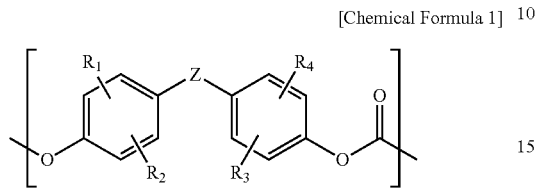

in Chemical Formula 1,
$R_1$, $R_2$, $R_3$ and $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

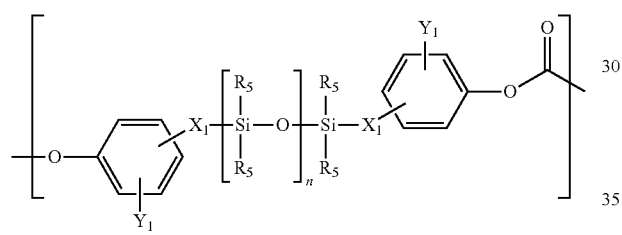

in Chemical Formula 2,
each of $X_1$ is independently $C_{1-10}$ alkylene,
each of $Y_1$ is hydrogen,
each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n is an integer of 1 to 200,

[Chemical Formula 3]

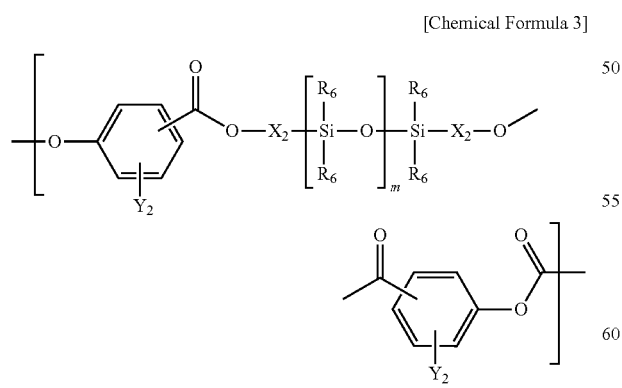

in Chemical Formula 3,
each of $X_2$ is independently $C_{1-10}$ alkylene,
each of $Y_2$ is independently hydrogen, $C_{1-6}$ alkyl, halogen, hydroxy, $C_{1-6}$ alkoxy, or $C_{6-20}$ aryl, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 1 to 200,
wherein the weight ratio of the copolycarbonate and the polycarbonate is 20:80 to 80:20, and
wherein the weight ratio between the weight of the repeating unit represented by Chemical Formula 1, and the total weight of the repeating unit represented by Chemical Formula 2 and the repeating unit represented by Chemical Formula 3 (Chemical Formula 1:(Chemical Formula 2+Chemical Formula 3)) is 1:0.04-0.07.

2. The polycarbonate resin composition according to claim 1, wherein
the polycarbonate comprises a repeating unit represented by the following Chemical Formula 4:

[Chemical Formula 4]

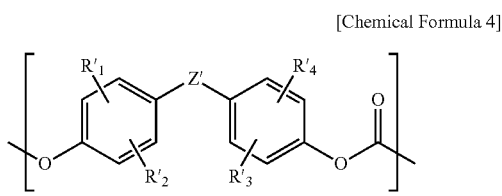

in the Chemical Formula 4,
$R'_1$, $R'_2$, $R'_3$ and $R'_4$ are each independently hydrogen, $C_{1-10}$ alkyl, $C_{1-10}$ alkoxy, or halogen, and
Z' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

3. The polycarbonate resin composition according to claim 1, wherein
the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

4. The polycarbonate resin composition according to claim 1, wherein
the repeating unit represented by Chemical Formula 1 is represented by the following Chemical Formula 1-1:

[Chemical Formula 1-1]

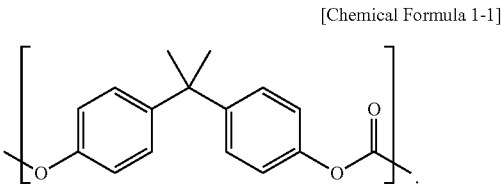

5. The polycarbonate resin composition according to claim 1, wherein
the repeating unit represented by Chemical Formula 2 is represented by the following Chemical Formula 2-2:

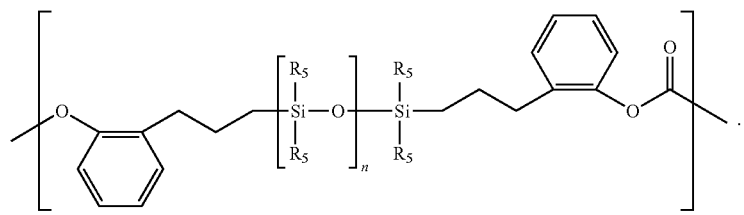

[Chemical Formula 2-2]

6. The polycarbonate resin composition according to claim 1, wherein
the repeating unit represented by Chemical Formula 3 is represented by the following Chemical Formula 3-2:

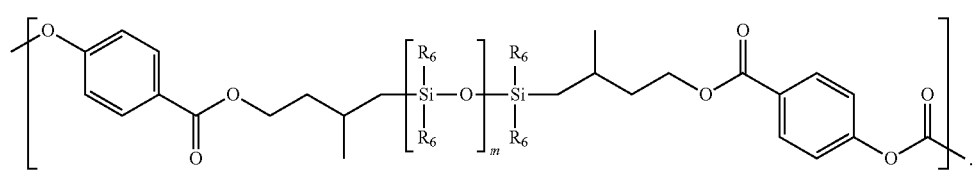

[Chemical Formula 3-2]

7. The polycarbonate resin composition according to claim 1, wherein n is an integer of 10 to 35.

8. The polycarbonate resin composition according to claim 1, wherein m is an integer of 45 to 100.

9. The polycarbonate resin composition according to claim 1, wherein the copolycarbonate has a weight average molecular weight of 1,000 to 100,000 g/mol.

10. The polycarbonate resin composition according to claim 2, wherein
the repeating unit represented by Chemical Formula 4 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

11. The polycarbonate resin composition according to claim 2, wherein
the repeating unit represented by Chemical Formula 4 is represented by the following Chemical Formula 4-1:

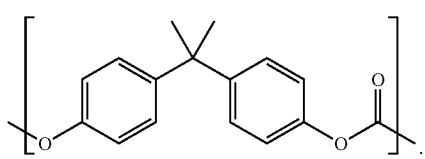

[Chemical Formula 4-1]

12. The polycarbonate resin composition according to claim 1, wherein
the weight average molecular weight of the polycarbonate is 1,000 to 100.000 g/mol.

13. The polycarbonate resin composition according to claim 1,
wherein a polysiloxane structure is not introduced in a main chain of the polycarbonate.

* * * * *